(12) United States Patent
Naruse et al.

(10) Patent No.: US 7,490,991 B2
(45) Date of Patent: Feb. 17, 2009

(54) GUIDE MECHANISM FOR CYLINDER APPARATUS

(75) Inventors: Tetsuya Naruse, Kashiwa (JP); Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 303 days.

(21) Appl. No.: 11/405,513

(22) Filed: Apr. 18, 2006

(65) Prior Publication Data

US 2006/0233474 A1 Oct. 19, 2006

(30) Foreign Application Priority Data

Apr. 19, 2005 (JP) ............................. 2005-121322

(51) Int. Cl.
*F16C 17/00* (2006.01)
*F16C 29/04* (2006.01)
*F16C 27/06* (2006.01)

(52) U.S. Cl. ............................. 384/26; 384/10; 384/37

(58) Field of Classification Search .................. 384/15, 384/26, 43–44, 49, 10, 37, 42, 51
See application file for complete search history.

(56) References Cited

U.S. PATENT DOCUMENTS

| 4,504,096 | A | | 3/1985 | Roch | |
|---|---|---|---|---|---|
| 4,856,415 | A | | 8/1989 | Noda | |
| 5,268,970 | A | * | 12/1993 | Tanaka | 384/43 |
| 5,330,272 | A | * | 7/1994 | Stoll | 384/26 |
| 5,429,438 | A | * | 7/1995 | Wood | 384/42 |
| 5,732,799 | A | * | 3/1998 | Chikamatsu et al. | 188/67 |
| 5,974,947 | A | * | 11/1999 | Noda | 92/88 |
| 6,227,336 | B1 | * | 5/2001 | Rudy | 188/43 |
| 6,253,660 | B1 | * | 7/2001 | Noda et al. | 92/88 |
| 6,880,974 | B2 | | 4/2005 | Moshammer | |
| 7,029,214 | B2 | * | 4/2006 | Shiba et al. | 409/241 |
| 2002/0061144 | A1 | * | 5/2002 | Kanamaru et al. | 384/26 |
| 2003/0103697 | A1 | * | 6/2003 | Mochizuki | 384/44 |
| 2004/0099492 | A1 | * | 5/2004 | Onuki et al. | 188/163 |
| 2004/0184684 | A1 | * | 9/2004 | Shiba et al. | 384/7 |

FOREIGN PATENT DOCUMENTS

| DE | 3802703 | | 8/1988 |
|---|---|---|---|
| EP | 482268 A1 | * | 4/1992 |
| EP | 0533399 | | 3/1993 |
| JP | 59081052 A | * | 5/1984 |
| JP | 63190908 A | * | 8/1988 |
| JP | 03004005 A | * | 1/1991 |
| JP | 5-133406 | | 5/1993 |
| JP | 2001187906 A | * | 7/2001 |
| JP | 2002-349509 | | 12/2002 |
| JP | 2002349509 A | * | 12/2002 |
| JP | 2004-522099 | | 7/2004 |

* cited by examiner

*Primary Examiner*—Marcus Charles
(74) *Attorney, Agent, or Firm*—Paul A. Guss

(57) ABSTRACT

A slider is displaceable in an axial direction on guide sections of a cylinder tube through a guide mechanism. A first elastic member is interposed between a first bearing support member of the guide mechanism and one retaining section of the slider. A bearing installed in the first bearing support member, is pressed continuously toward the guide section. A second bearing support member is installed via a second elastic member between the guide section and another retaining section of the slider. A bearing provided on the second bearing support member is pressed toward the guide section by means of a resilient force of the second elastic member.

11 Claims, 11 Drawing Sheets

GUIDE MECHANISM FOR CYLINDER APPARATUS

BACKGROUND OF THE INVENTION

1. Field of the Invention

The present invention relates to a guide mechanism for a cylinder apparatus, for movably retaining and guiding a displacement member of the cylinder apparatus with respect to a main cylinder body.

2. Description of the Related Art

A cylinder apparatus such as a rodless cylinder has been used as a means for transporting a workpiece. Such a rodless cylinder includes a piston, which is displaceable within a main cylinder body, and a piston yoke connected to the piston, which is exposed to the outside through a slit formed on an upper surface of the main cylinder body. A slider is installed on the piston yoke. The slider is displaced in the axial direction of the main cylinder body by displacement of the piston, in order to transport the workpiece.

However, generally in the case of the rodless cylinder described above, a gap that results from dimensional dispersion of respective members may appear between the main cylinder body and the slider in some situations, wherein the gap is caused by dimensional dispersion of respective members including, for example, the slider, the piston, and the main cylinder body, when they are assembled. In such a situation, it is feared that looseness or backlash may arise when the slider is displaced along the main cylinder body.

Figure 11:
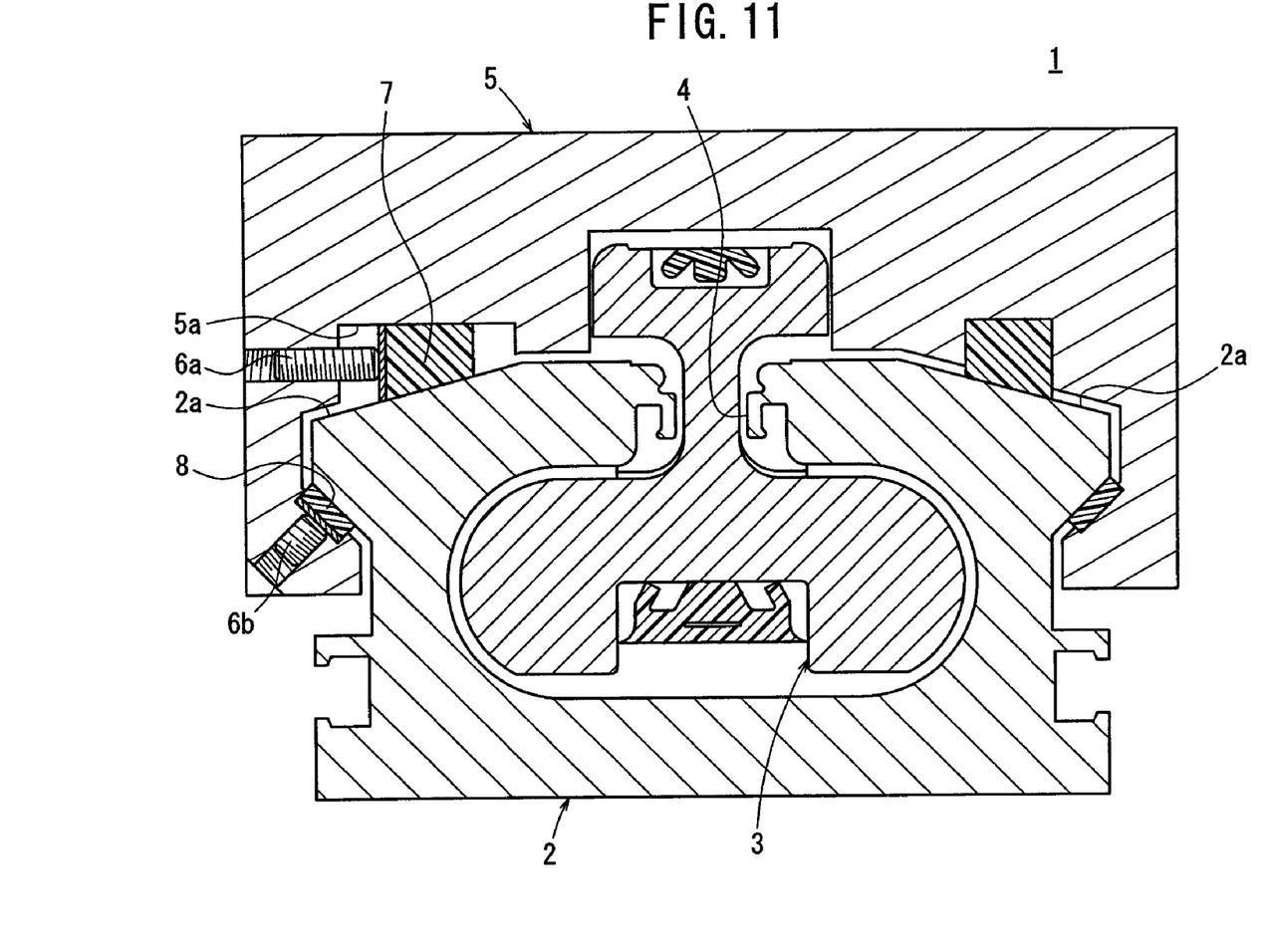
FIG. 11 is a vertical sectional view illustrating a cylinder apparatus having a guide mechanism in accordance with a conventional technique.

A cylinder apparatus is known, which is provided with a guide mechanism capable of avoiding the aforementioned backlash generated in the slider. As shown in FIG. 11, the cylinder apparatus includes a piston yoke 3, which is connected to a piston and which is inserted into a cylinder tube 2. An upper surface 2a of the cylinder tube 2 is inclined so that its height is gradually lowered from a substantially central portion of the cylinder tube 2 in the widthwise direction, with a slit 4 intervening therebetween.

A first sliding member 7, which is displaceable in the widthwise direction of the cylinder apparatus 1 by means of a screw 6a that is threaded with a slider 5, is provided between the upper surface 2a of the cylinder tube 2 and a lower surface 5a of the slider 5. On the other hand, a second sliding member 8 is also provided between a lower side portion of the cylinder tube 2 and the slider 5, in the same manner as described above.

The first and second sliding members 7, 8, which are provided between the upper surface 2a of the cylinder tube 2 and the lower surface 5a of the slider 5, function as bearings when the slider 5 is displaced in the axial direction. The first and second sliding members 7, 8 are displaced by pressing them in the widthwise direction of the cylinder apparatus 1 through threaded rotation of the screws 6a, 6b. The first and second sliding members 7, 8 abut against the upper surface 2a of the cylinder tube 2 and the lower surface 5a of the slider 5, so as to press them at predetermined pressures. Accordingly, the gap therebetween may be eliminated by adjusting the spacing distance between the cylinder tube 2 and the slider 5, in order to avoid backlash of the slider 5 with respect to the cylinder tube 2 (see, for example, Japanese Laid-Open Patent Publication No. 2002-349509).

The guide mechanism of the cylinder apparatus 1 disclosed in Japanese Laid-Open Patent Publication No. 2002-349509 is constructed such that pressing forces, which are exerted by the first and second sliding members 7, 8 on the cylinder tube 2 and the slider 5, are handled by adjusting the amount of rotation (for example, tightening torque) of the screws 6a, 6b, which thereby act to displace the first and second sliding members 7, 8 in the widthwise direction. However, it is assumed that the displacement amount of each of the first and second sliding members 7, 8, i.e., the pressing force exerted on the cylinder tube 2 and the slider 5, may suddenly change when the screws 6a, 6b is rotated.

Therefore, when each of the first and second sliding members 7, 8, which function as bearings, is pressed by a predetermined pressing force against the cylinder tube 2 and the slider 5, only a narrow adjustment range for providing a desired pressing force is possible, and reproducibility of results cannot be easily obtained. Further, a worker having skilled techniques is required to perform the adjustment operation.

The dimensional dispersion of the respective members such as the cylinder tube 2, the slider 5, the piston, and the piston yoke 3 differ depending on the actual cylinder apparatus 1 in some cases. In such a situation, it is necessary that the adjustment operation be performed for adjusting the gap for each respective cylinder apparatus 1, after the assembling operation of the cylinder apparatus 1 has been completed. It is necessary that the adjustment operation be performed by an operator by rotating the screws 6a, 6b while observing the state of the gap that occurs in the cylinder apparatus 1. Therefore, the adjustment operation, which must be performed for each respective cylinder apparatus 1, is complicated. Thus, production efficiency of the cylinder apparatus 1 cannot be measurably improved.

When the cylinder apparatus 1 is used for long periods of time, the first and second sliding members 7, 8 provided for the slider 5 may become worn or abraded due to continuous contact with the cylinder tube 2, resulting in a change in the relative positional relationship between the slider 5 and the cylinder tube 2, in spite of attempts to adjust and fix the positional relationship by the first and second sliding members 7, 8. As a result, a gap appears again between the slider 5 and the cylinder tube 2 causing backlash as described above. Thus, it is necessary for the adjustment operation to be performed repeatedly.

SUMMARY OF THE INVENTION

A general object of the present invention is to provide a guide mechanism for a cylinder apparatus, which makes it possible to avoid backlash of a displacement member by means of convenient adjustment mechanism, thus enabling smooth displacement of the displacement member while also improving production efficiency.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
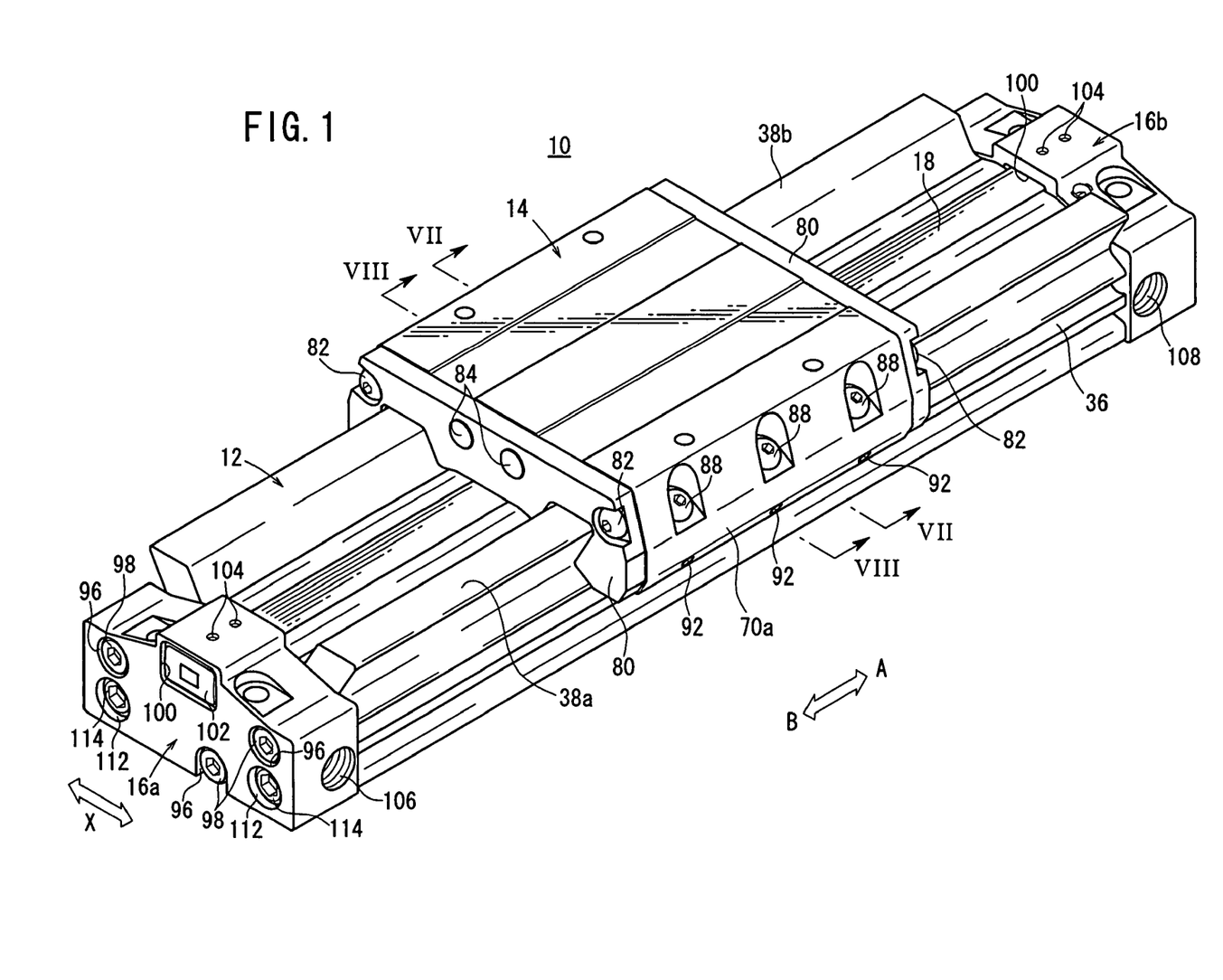
FIG. 1 is a perspective view illustrating a cylinder apparatus to which a guide mechanism according to an embodiment of the present invention is applied.

With reference to FIG. 1, reference numeral 10 indicates a cylinder apparatus to which a guide mechanism according to an embodiment of the present invention is applied.

Figure 2:
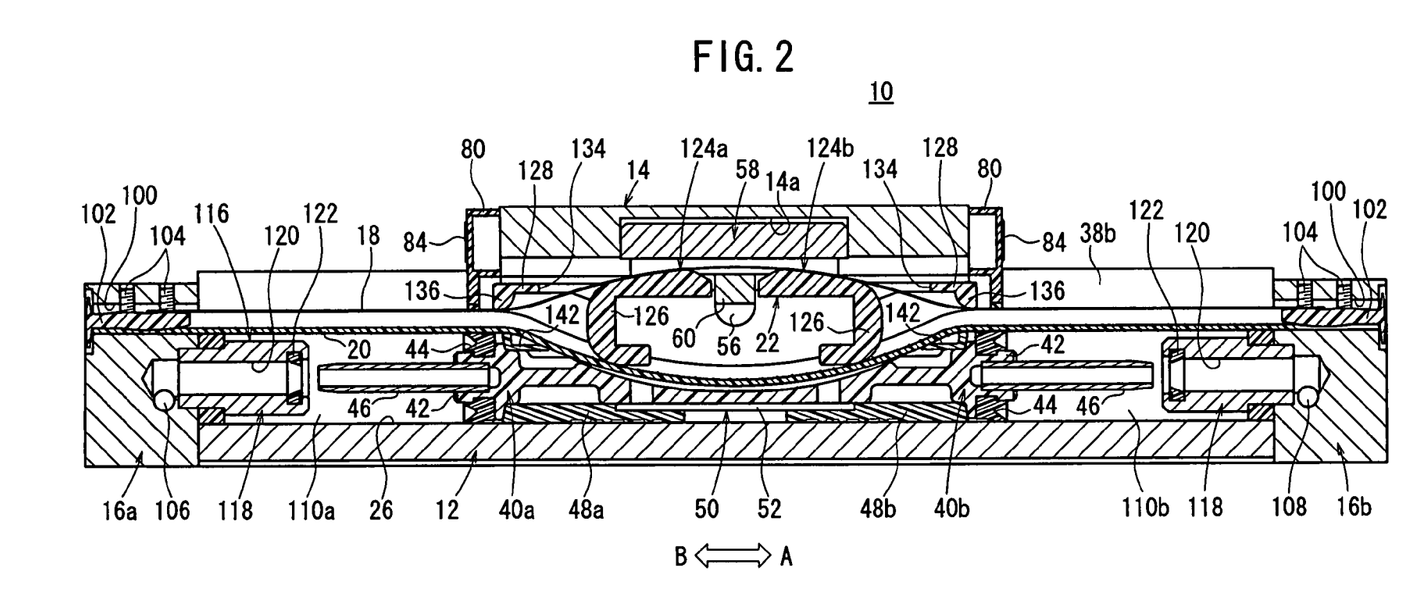
FIG. 2 is a longitudinal sectional view taken along the axial direction of the cylinder apparatus shown in FIG. 1.

As shown in FIGS. 1 and 2, the cylinder apparatus 10 comprises a cylinder tube (main actuator body) 12, which is lengthy in the axial direction, a slider (displacement member) 14, which is attached to the cylinder tube 12 and which is movable back and forth in the axial direction, and a pair of end blocks 16a, 16b, which are installed to respective ends of the cylinder tube 12.

The cylinder apparatus 10 further comprises a belt guide mechanism 22 (see FIG. 2), which guides an upper belt 18 and a lower belt 20 (see FIGS. 7 and 8) that are installed in the cylinder tube 12, and a guide mechanism 24 (see FIGS. 7 and 8) provided between the slider 14 and the cylinder tube 12, which smoothly guides the slider 14 with respect to the cylinder tube 12.

Figure 3:
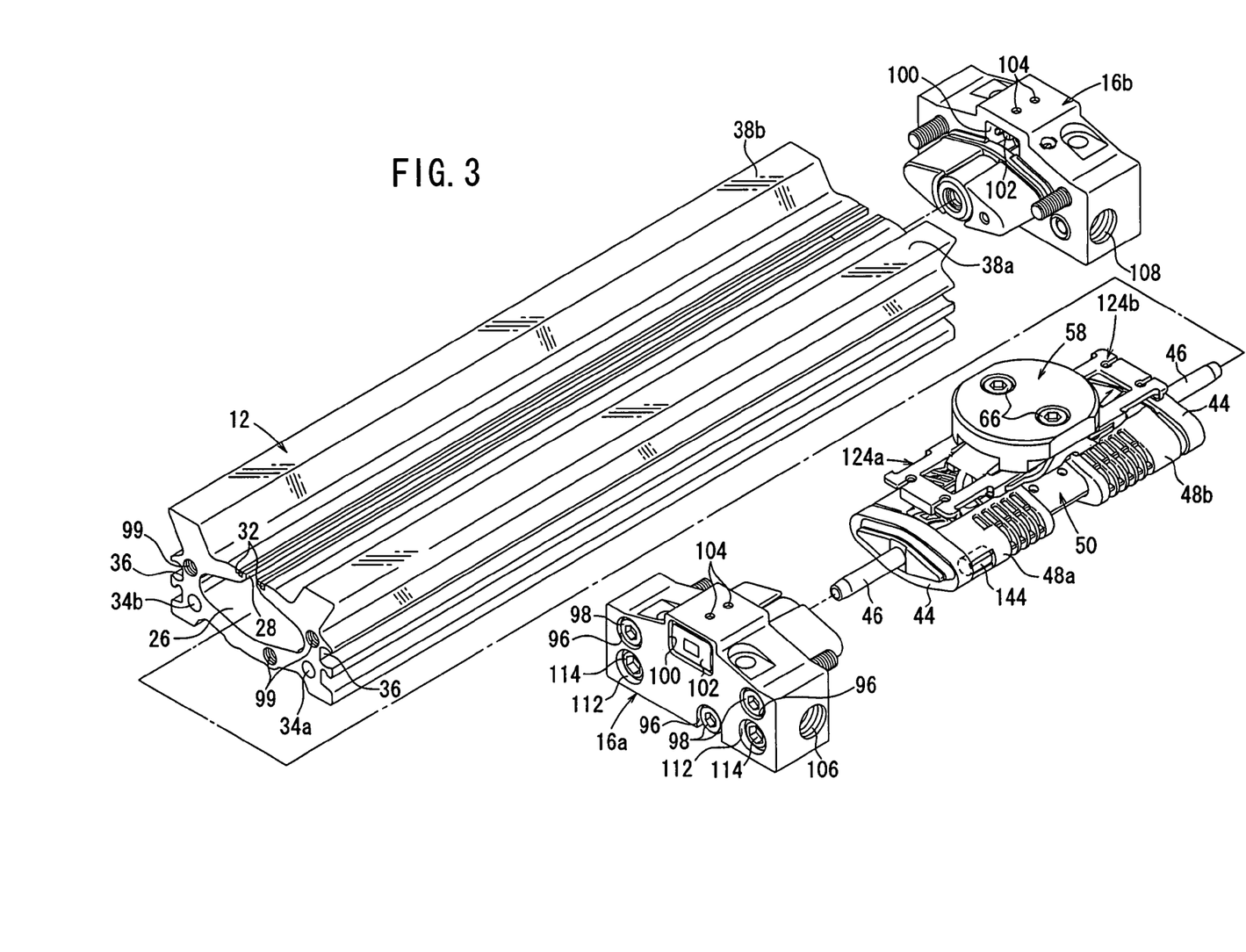
FIG. 3 is, with partial omission, an exploded perspective view illustrating the cylinder apparatus shown in FIG. 1.
Figure 7:
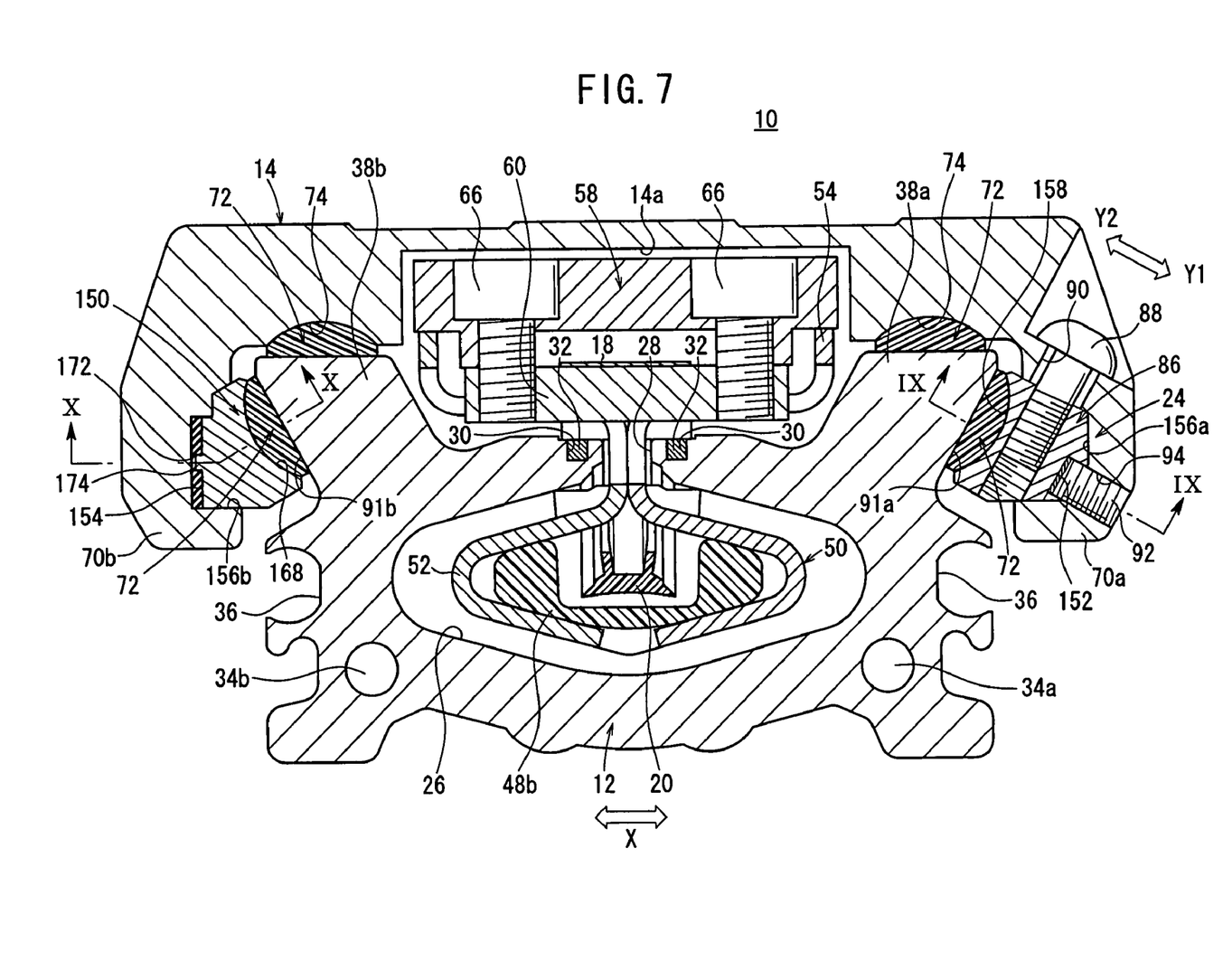
FIG. 7 is a vertical sectional view taken along line VII-VII shown in FIG. 1.

As shown in FIGS. 3 and 7, a bore section 26, which has a substantially lozenge-shaped cross section, is formed in the axial direction inside the cylinder tube 12. A slit 28, which is open in the axial direction, is formed on an upper surface of the cylinder tube 12. The bore section 26 communicates with the outside via the slit 28.

The upper belt 18 and the lower belt 20, which seal the slit 28 by closing the slit 28 in both of vertical upward and downward directions, are attached to the slit 28 of the cylinder tube 12. The upper belt 18 is formed of, for example, a metal material having a sheet-shaped form. The lower belt 20 is formed of, for example, a resin material.

Two magnetic members 32 (for example, permanent magnets) are installed in attachment grooves 30 and extend in the axial direction on both sides of the slit 28. The upper belt 18 is attracted by magnetic forces produced by the magnetic members 32, and the slit 28 is closed at the upper portion thereof. Accordingly, invasion of external dust or the like via the slit 28 into the interior of the cylinder tube 12 is prevented.

Both ends of the upper belt 18 and the lower belt 20 are fixed respectively to the pair of end blocks 16a, 16b that are connected respectively at both ends of the cylinder tube 12 (see FIG. 2).

Two bypass passages 34a, 34b, which extend in the axial direction, are formed in the vicinity of the bore section 26 of the cylinder tube 12. The bypass passages 34a, 34b are separated from the bore section 26 by predetermined distances. Concentrated piping (not shown), through which the pressure fluid flows, is connected to the bypass passages 34a, 34b.

On the other hand, a pair or plural pairs of sensor attachment grooves 36, which extend in the axial direction, are formed on both side surfaces of the cylinder tube 12. A position-detecting sensor (not shown) is installed in the sensor attachment groove 36, in order to detect the displacement position of the pistons 40a, 40b as described later on.

Two guide sections 38a, 38b, each of which protrudes upwardly by a predetermined height and which are separated from each other by a predetermined distance in the widthwise direction (direction of arrow X) perpendicular to the axis of the slit 28, are formed on the upper surface of the cylinder tube 12. The guide sections 38a, 38b extend in the axial direction of the cylinder tube 12. The slider 14 engages with the guide sections 38a, 38b for displacement in the axial direction by means of the guide mechanism 24.

The guide sections 38a, 38b are formed so as to be inclined by a predetermined angle in the widthwise direction (direction of arrow X) while being separated from the slit 28 of the cylinder tube 12. The guide sections 38a, 38b are formed so that upper surfaces of the guide sections 38a, 38b are substantially horizontal. In other words, the guide sections 38a, 38b are formed to have substantially symmetrical shapes in the widthwise direction (direction of arrow X) of the cylinder tube 12 about the center of the slit 28. The guide sections 38a, 38b have substantially identical heights.

Figure 4:
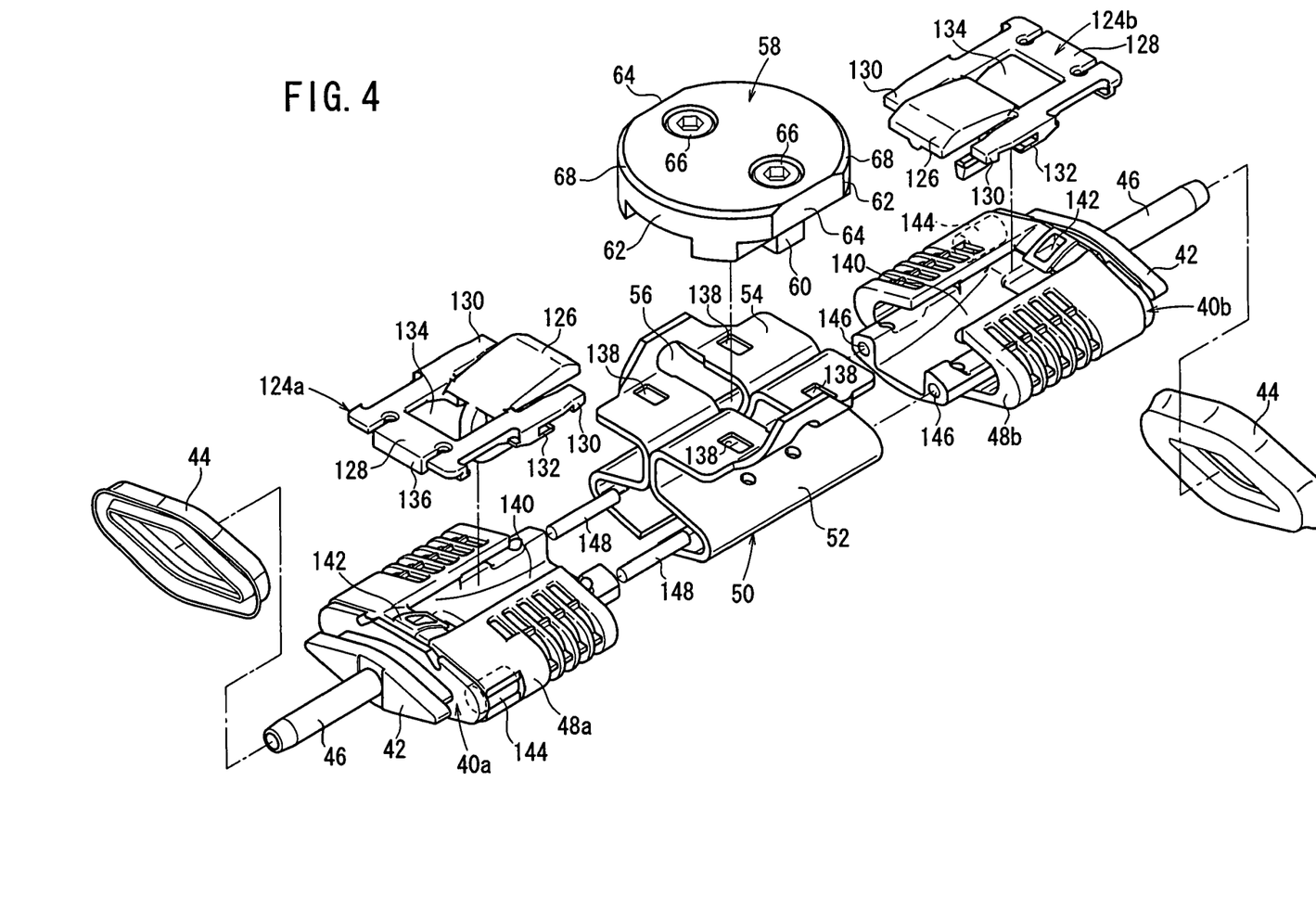
FIG. 4 is an exploded perspective view illustrating a belt guide mechanism of the cylinder apparatus shown in FIG. 1.

As shown in FIG. 2, two pistons 40a, 40b, which are complementary in shape to the cross-sectional shape of the bore section 26, are inserted movably back and forth within the bore section 26 of the cylinder tube 12. As shown in FIGS. 3 and 4, a projection 42 is formed at one end of each of the pistons 40a, 40b. An annular seal member 44 is installed on the circumferential edge of the projection 42. Accordingly, when the pistons 40a, 40b are inserted into the bore section 26 of the cylinder tube 12, spaces between the pistons 40a, 40b and the inner wall surface of the bore section 26 are sealed by the seal members 44 and air-tightness is retained within the bore section 26.

As shown in FIG. 4, shaft sections 46, which protrude toward the end blocks 16a, 16b, are provided on the projections 42 of the pistons 40a, 40b.

A piston yoke 50 is interposed between one piston 40a and the other piston 40b through wear rings 48a, 48b. The piston yoke 50 is integrally connected to the pistons 40a, 40b. The piston yoke 50 is formed, for example, by press-forming a plate member. The piston yoke 50 includes an insertion section 52, which is connected between the pistons 40a, 40b and which has a substantially lozenge-shaped cross section corresponding to the cross-sectional shape of the bore section 26, and a yoke section 54, which has a substantially T-shaped form disposed above the insertion section 52.

Figure 8:
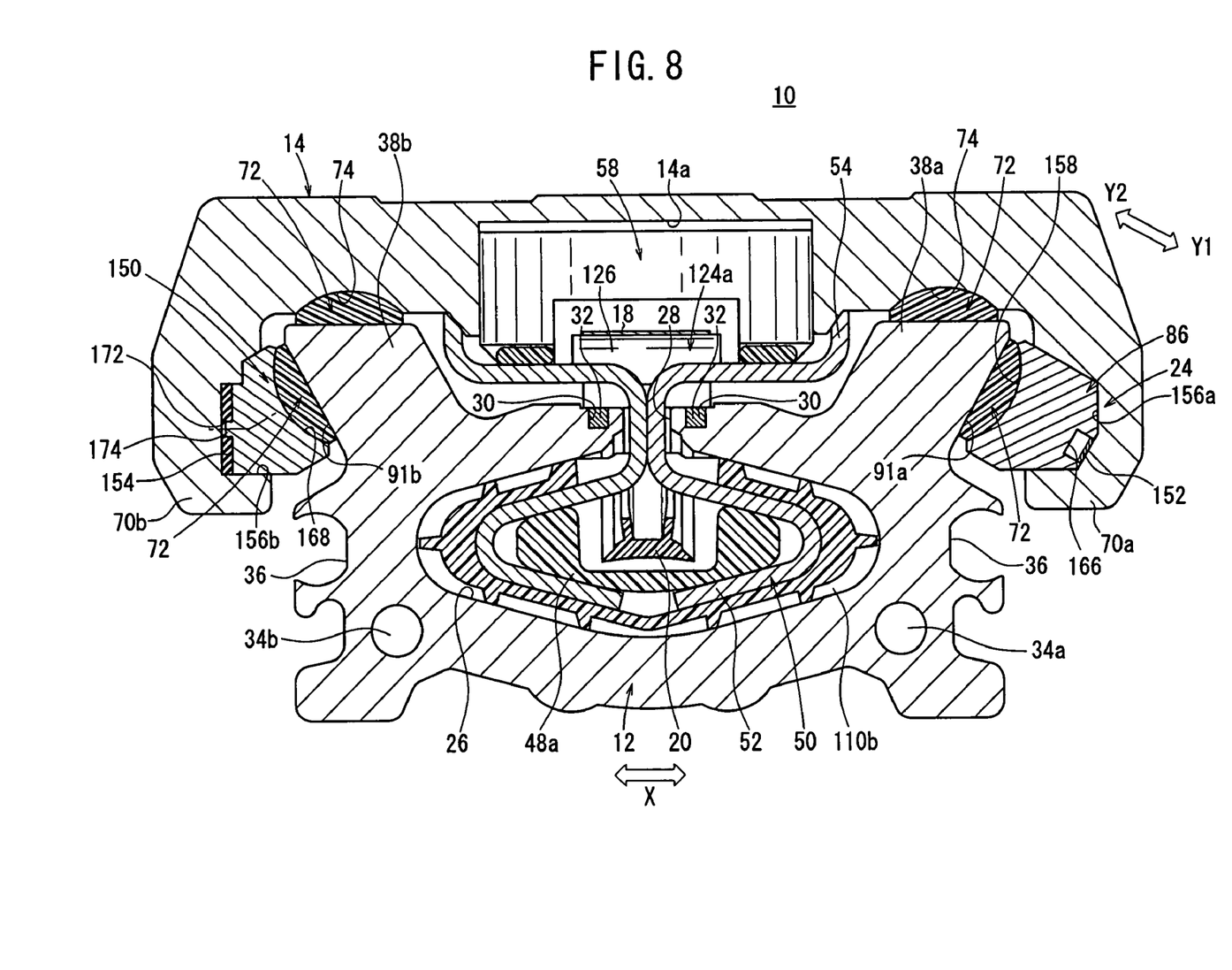
FIG. 8 is a vertical sectional view taken along line VIII-VIII shown in FIG. 1.

As shown in FIGS. 7 and 8, the piston yoke 50 is installed in the following manner. The insertion section 52 is inserted into the bore section 26 in the same manner as the pistons 40a, 40b. A connecting portion between the insertion section 52 and the yoke section 54 is inserted into the slit 28 so that the yoke section 54 is disposed on the upper side of the cylinder tube 12.

The width of the yoke section 54 is expanded to have a predetermined width in the widthwise direction (direction of arrow X) of the cylinder tube 12. The slider 14 is installed onto the yoke section 54. On the other hand, as shown in FIG. 4, an engaging groove 56, which extends in the widthwise direction (direction of arrow X), is formed at a substantially central portion of the yoke section 54. A substantially disk-shaped coupler 58 is installed in the rectangular engaging groove 56 by means of an engaging member 60.

The outer wall surface of the coupler 58 is composed of a pair of curved surface sections 62 having the same diameter, and a pair of flat surface sections 64 formed substantially in parallel to the axis of the cylinder tube. In other words, the outer wall surface of the coupler 58 has curved surfaces having the same diameter divided by a pair of flat surface sections 64 formed substantially in parallel and substantially symmetrically with respect to the axis of the cylinder tube 12. The divided curved surfaces are constructed as a pair of curved surface sections 62, respectively.

That is, when the coupler 58 is installed on the piston yoke 50, the curved surface sections 62 are arranged on respective sides of the end blocks 16a, 16b, and the flat surface sections 64 are arranged substantially in parallel to side surfaces of the cylinder tube 12.

The engaging member 60 is installed on the lower surface of the coupler 58, so that the engaging member 60 is substantially perpendicular to the axis of the cylinder tube 12. The engaging member 60 is fixed to the coupler 58 by two bolts 66.

Further, chamfering sections 68, each of which is inclined at a predetermined angle (for example, 45°) in the circumferential direction of the coupler 58, are formed at boundary portions between the upper surface and the curved surface sections 62 of the coupler 58, respectively.

As shown in FIGS. 5 to 8, the slider 14 has a substantially U-shaped cross section. A coupler-insertion hole 14a is formed on a lower surface side, opposed to the cylinder tube 12. The coupler 58, which is installed on the piston yoke 50, is inserted into the coupler-insertion hole 14a. The shape of the coupler-insertion hole 14a is slightly larger than that of the coupler 58 in the radial direction. Accordingly, the slider 14 is integrally installed on the upper portion of the coupler 58.

In this arrangement, the slider 14 includes a pair of retaining sections 70a, 70b, which protrude in a vertical downward direction, and which are formed on both sides of the slider 14 in the widthwise direction (direction of arrow X). The retaining sections 70a, 70b engage with the guide sections 38a, 38b of the cylinder tube 12 through the guide mechanism 24 provided therein. That is, the slider 14 is integrally installed with the pistons 40a, 40b through the aid of the coupler 58 and the piston yoke 50. The slider 14 is displaceable in the axial direction while being guided by the guide sections 38a, 38b when the pistons 40a, 40b are displaced in the axial direction.

As shown in FIGS. 5 to 8, retaining grooves 74, in which bearings 72 are retained, are formed on the lower surface of the slider 14 at positions opposed to the guide sections 38a, 38b of the cylinder tube 12. The retaining grooves 74 are formed respectively in the axial direction. The retaining grooves 74 are formed as recesses, wherein the cross sections thereof are substantially circularly arc-shaped. Further, two deep grooves 76 (see FIG. 6), which are deeper than the depth of the retaining grooves 74, are formed at both ends of the slider 14 in the axial direction.

Figure 5:
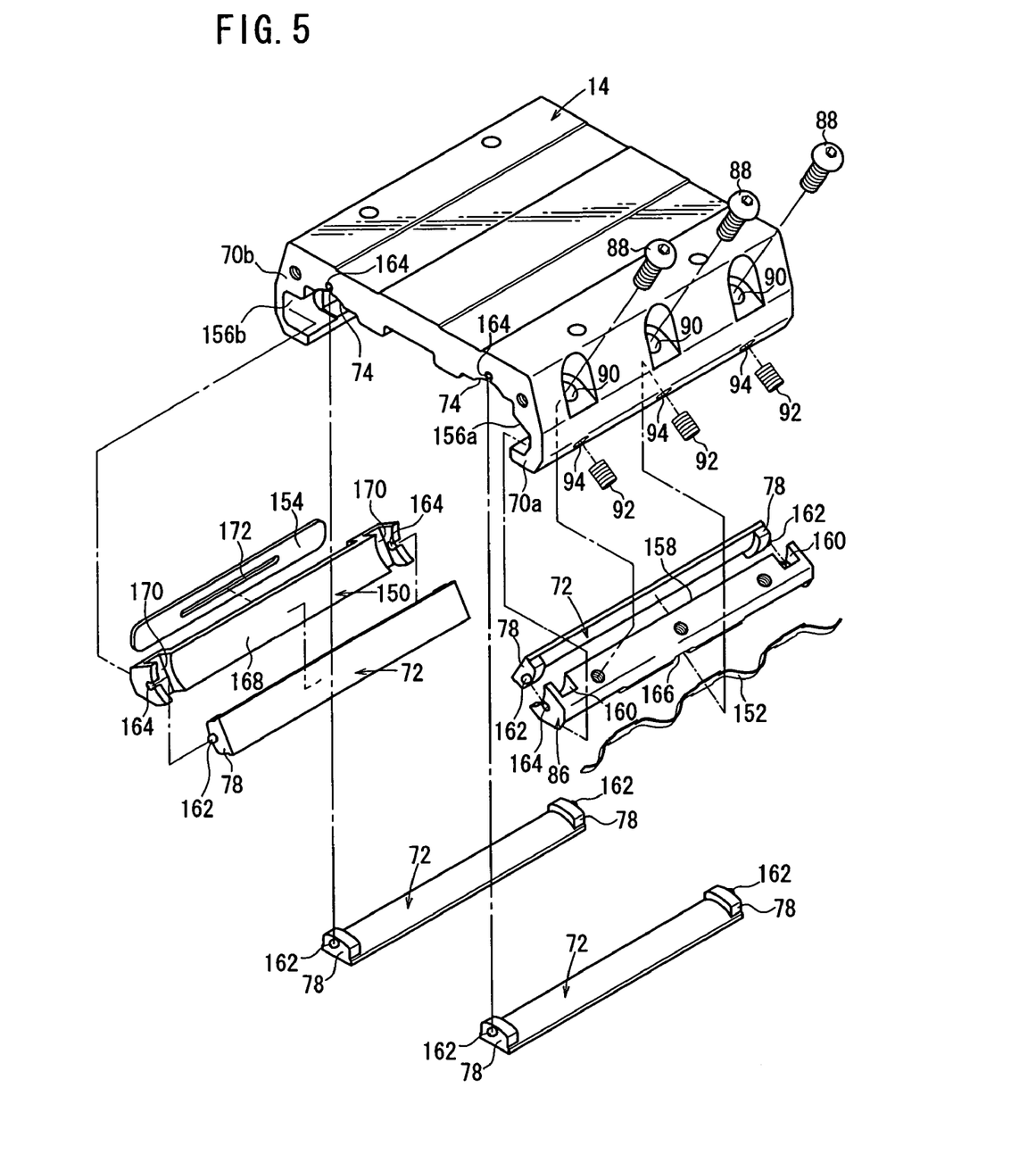
FIG. 5 is an exploded perspective view illustrating the guide mechanism of the cylinder apparatus shown in FIG. 1.
Figure 6:
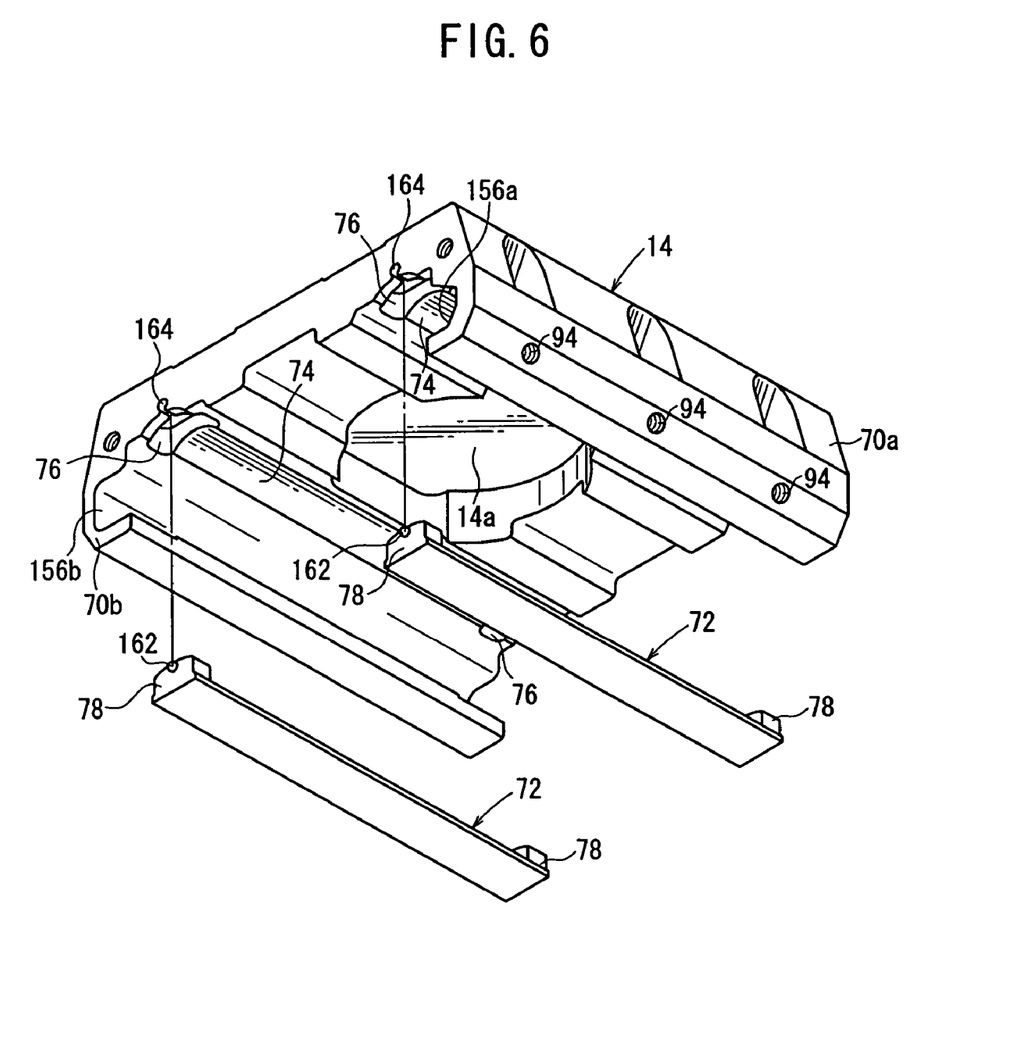
FIG. 6 is an exploded perspective view illustrating a slider of the cylinder apparatus shown in FIG. 1 as viewed from a lower position.

As shown in FIG. 5, the bearings 72, each of which includes a pair of flange sections 78 protruding at both ends thereof, are installed in the retaining grooves 74. The flange sections 78 engage within the deep grooves 76 of the retaining grooves 74. The bearings 72 are formed such that the distance dimension thereof, in the axial direction between one flange section 78 and the other flange section 78, is larger than the distance between the pair of deep grooves 76. Therefore, the bearings 72 are arranged within the retaining grooves 74 so as to be slightly displaceable in the axial direction.

That is, the bearings 72 are interposed between the lower surface of the slider 14 and the upper surfaces of the guide sections 38a, 38b of the cylinder tube 12. Therefore, the slider 14 can be smoothly displaced along the sliding surfaces between the slider 14 and the guide sections 38a, 38b.

Projections 162, which protrude respectively toward the end blocks 16a, 16b, are formed on end surfaces of the flange sections 78. When the flange sections 78 engage with the deep grooves 76, the projections 162 engage within recesses 164, which are formed on end surfaces of the slider 14. Accordingly, the bearings 72 are prevented from becoming disengaged from the retaining grooves 74.

As shown in FIG. 1, cover members 80 are installed on both end surfaces of the slider 14 by bolts 82, so that both end surfaces are covered therewith respectively. Fastening members 84 are provided at substantially central portions of the cover members 80. The fastening members 84 protrude slightly from the end surfaces of the cover members 80 toward the end blocks 16a, 16b (see FIG. 2). Accordingly, for example, when an unillustrated stopper mechanism is provided on the cylinder tube 12 in order to regulate displacement when the end surface of the slider 14 abuts against the stopper mechanism, impact caused upon contact between the slider 14 and the stopper mechanism can be buffered by the fastening member 84.

When the cover members 80 are formed of flexible elastic members (for example, rubber), the cover members 80 can be flexibly bent in order to install them onto the end surfaces of the slider 14, after the slider 14 has been installed on the cylinder tube 12. In other words, when the slider 14 is assembled with the cylinder tube 12, it is unnecessary for the cover members 80 to be installed beforehand on the slider 14. Therefore, the cover members 80 can be assembled with greater facility.

Dust-removing members (not shown) may be integrally formed on lower surfaces of the cover members 80, so that the dust-removing members are opposed to the upper surface of the cylinder tube 12. Accordingly, invasion of the dust or the like into the slider 14 through gaps between the cylinder tube 12 and the cover members 80 can be avoided.

Further, lubricating members (for example, porous members), which contain a lubricant therein, may be provided within the cover members 80, on end surfaces attached to the sides of the slider 14. Accordingly, the lubricating members may be used to continuously lubricate the guide sections 38a, 38b of the cylinder tube 12 over which the bearings 72 are slidably displaced. As a result, sliding resistance is reduced when the bearings 72 are displaced. Therefore, the slider 14 can be displaced more smoothly with respect to the cylinder tube 12.

The slider 14 has a plurality of (for example, three) through-holes 90, which are formed in one retaining section 70a. Fixing bolts (fixing members) 88 are inserted into the through-holes 90 in order to fix thereto a first bearing support member (retaining member) 86 of the guide mechanism 24 (as described later on). The through-holes 90 are separated from each other by predetermined distances in the axial direction of the slider 14. Further, the through-holes 90 are inclined by a predetermined angle, so that the through-holes 90 are substantially in parallel with the side surface (sliding contact surface) 91a of the guide section 38a when the slider 14 is installed on the cylinder tube 12.

Portions thereof, which are disposed in the vicinity of the through-holes 90, are recessed at a predetermined depth as compared with the side surface of the slider 14. Therefore, when the fixing bolts 88 are inserted into the through-holes 90 in order to fix the first bearing support member 86 of the guide mechanism 24, the fixing bolts 88 do not protrude from the side surface of the slider 14.

As shown in FIG. 7, the retaining section 70a has a plurality of screw holes 94 with plugs 92 threaded therein, which are disposed at positions below the through-holes 90. The screw holes 94 are inclined by a predetermined angle, so that the screw holes 94 are substantially perpendicular to the side surface 91a of the guide section 38a of the cylinder tube 12 when the slider 14 is installed on the cylinder tube 12. That is, the screw holes 94 are formed to be substantially perpendicular to the through-holes 90.

As shown in FIGS. 1 to 3, the end blocks 16a, 16b are provided at both ends of the cylinder tube 12 respectively, so that the openings of the bore section 26 are closed thereby. Screw members 98 are inserted into screw-installing holes 96 in the end blocks 16a, 16b. The screw members 98 are threaded into screw holes 99 of the cylinder tube 12. Accordingly, the end blocks 16a, 16b are integrally assembled to the cylinder tube 12.

As shown in FIG. 2, the end blocks 16a, 16b have holes 100 therein, which are formed at upper portions for insertion of the upper belt 18 and the lower belt 20. The ends of the upper belt 18 and the lower belt 20 are fixed by two pairs of fixing screws 104, and by means of fixing members 102, which are inserted into the holes 100.

As shown in FIGS. 1 and 3, a first port 106 and a second port 108, which are connected to a pressure fluid supply source via a directional control valve (not shown), are formed respectively on side surfaces of the end blocks 16a, 16b. A pressure fluid (for example, compressed air) is selectively supplied from the pressure fluid supply source to the first and second ports 106, 108. The first and second ports 106, 108 communicate respectively with cylinder chambers 110a, 110b (see FIG. 2) in the cylinder tube 12 via unillustrated passages disposed in the end blocks 16a, 16b or via bypass passages 34a, 34b provided in the cylinder tube 12. Cylinder chambers 110a, 110b are defined by the bore section 26, the end blocks 16a, 16b, and the pistons 40a, 40b respectively.

As shown in FIG. 1, outer ports 112 are formed on end surfaces of the end blocks 16a, 16b. The outer ports 112 communicate with the cylinder chambers 110a, 110b in the cylinder tube 12 via unillustrated passages disposed in the end blocks 16a, 16b or via bypass passages 34a, 34b provided in the cylinder tube 12. Threaded sealing screws 114 seal the outer ports 112.

As shown in FIG. 2, each of the end blocks 16a, 16b includes a decelerating mechanism 116, which is disposed on an inner wall surface side thereof, opposed to the cylinder tube 12, in order to decelerate the displacement speed of the pistons 40a, 40b.

The decelerating mechanism 116 includes a cylindrical member 118, which is installed in the end blocks 16a, 16b opposed to the pistons 40a, 40b. Insertion holes 120 are formed in the axial direction in the cylindrical member 118. An annular check packing 122 is installed in an annular groove on the inner circumferential surface of the insertion hole 120. Shaft sections 46 connected to the pistons 40a, 40b are inserted into the insertion holes 120 when the pistons 40a, 40b are displaced in the axial direction. In this situation, the check packing 122 abuts and surrounds the outer circumferential surface of the shaft section 46, in order to block the flow passage from the cylinder chambers 110a, 110b to the insertion hole 120. Accordingly, fluid contained in the cylinder chambers 110a, 110b is discharged at a minute flow rate into the first and second ports 106, 108 via an unillustrated narrow bypass passage defining a minute flow passage. Therefore, displacement resistance is brought about when the pistons 40a, 40b are displaced. Accordingly, the displacement speed of the pistons 40a, 40b can be gradually decelerated. That is, the decelerating mechanism 116 performs a speed control function, in order to gradually decelerate the speed of the pistons 40a, 40b as the pistons 40a, 40b approach the end blocks 16a, 16b.

As shown in FIGS. 3 to 4, the belt guide mechanism 22 includes a pair of guide members 124a, 124b, which are provided at upper portions of the pistons 40a, 40b, and wear rings 48a, 48b, which are connected respectively to the pistons 40a, 40b. Each of the guide members 124a, 124b and the wear rings 48a, 48b is formed of, for example, a resin material.

As shown in FIG. 4, each of the guide members 124a, 124b is composed of a belt separator section 126, which has a substantially C-shaped cross section, a belt-holding section 128, which protrudes from a substantially central portion of the belt separator section 126 toward one end, and first pawls 130 and second pawls 132, which protrude on sides of the belt separator section 126 and the belt-holding section 128.

A substantially rectangular belt insertion hole 134, into which the upper belt 18 is inserted, is formed between the belt separator section 126 and the belt-holding section 128. As shown in FIG. 2, the belt separator section 126, which has a substantially C-shaped cross section, is formed with a shape so that sliding resistance of the upper belt 18 and the lower belt 20 does not increase excessively.

As shown in FIG. 2, the belt separator section 126 is interposed between the upper belt 18 and the lower belt 20, which are curved and separated vertically from each other. The upper belt 18 is guided along a space formed between the belt separator section 126 and the slider 14. The lower belt 20 is guided along a space formed between the belt separator section 126 and the pistons 40a, 40b.

The belt-holding section 128 includes a projection 136, which protrudes a predetermined length downwardly. The upper belt 18 is pressed toward the cylinder tube 12 by the projection 136, and thus the upper belt 18 and the lower belt 20 approach one another (see FIG. 2).

As shown in FIG. 4, the first pawls 130, which protrude downwardly a predetermined length, are formed as a pair on both sides of the belt separator section 126. The first pawls 130 are installed respectively into grooves 138 formed in the yoke section 54 of the piston yoke 50. The second pawls 132 are installed on a lower surface of the yoke section 54. Accordingly, the piston yoke 50 and the guide members 124a, 124b are firmly and integrally connected to each other. More specifically, when the slider 14 moves, the belt separator section 126 functions to separate the upper belt 18 and the lower belt 20 from each other, and the belt-holding section 128 functions to cause the upper belt 18 and the lower belt 20 to approach one another.

As shown in FIG. 4, the wear rings 48a, 48b are formed with a cross-sectional shape corresponding to the bore section 26. A substantially rectangular cutout 140 is formed substantially centrally on the upper surface thereof. A substantially rectangular lower belt guide section 142, which guides the lower belt 20, is formed on one end side of the cutout 140. The lower belt guide section 142 has one end, which is formed at a position in the height direction substantially equivalent to the outer circumferential surface of the wear rings 48a, 48b, and another end, which is curved slightly in the downward direction.

The lower belt guide section 142 has a curved shape so that sliding resistance does not increase excessively when the lower belt 20 is guided thereby (see FIG. 2).

A magnet 144 is installed in a hole formed at one end of the wear rings 48a, 48b. A magnetic field from the magnet 144 is detected by an unillustrated sensor, which is installed in the sensor attachment groove 36 of the cylinder tube 12 (see FIG.

1). Accordingly, the position of the pistons 40a, 40b can be detected. Pin members 148 are forcibly inserted into pin holes 146 of the pistons 40a, 40b respectively, and thus the two pistons 40a, 40b are connected to the piston yoke 50 respectively through the wear rings 48a, 48b.

As shown in FIGS. 5 to 8, the guide mechanism 24 is disposed in opposition to the guide sections 38a, 38b of the cylinder tube 12, proximate to the retaining sections 70a, 70b of the slider 14. The guide mechanism 24 includes a first bearing support member 86, which is disposed in one retaining section 70a opposing a side surface 91a of the guide section 38a, a second bearing support member (retaining member) 150, which is disposed in the other retaining section 70b opposing the guide section 38b, a first elastic member 152 interposed between the first bearing support member 86 and the retaining section 70a, and a second elastic member 154 interposed between the second bearing support member 150 and the retaining section 70b.

The first bearing support member 86 is installed in an installation groove 156a formed on the inner wall surface of one retaining section 70a, which is fixed to the slider 14 by a plurality of fixing bolts 88 inserted into through-holes 90 formed in the retaining section 70a.

The first bearing support member 86 may be formed of a metal material such as aluminum. The first bearing support member 86 makes abutment in such a manner that the first bearing support member 86 is substantially perpendicular to the side surface 91a of one guide section 38a. The fixing bolts 88 are threaded with the first bearing support member 86, so that the fixing bolts 88 are substantially parallel to the side surface 91a of the guide section 38a. In this arrangement, it is desirable that the abutment surface provided between the slider 14 and the first bearing support member 86, which is forcibly pressed by the fixing bolts 88 to effect contact therebetween, is substantially perpendicular to the side surface 91a of the guide section 38a.

The first bearing support member 86 has a retaining groove 158 which retains the bearing 72 therein, and which is formed on a side surface 91a opposed to the guide section 38a. The retaining groove 158 is formed in the axial direction of the slider 14, wherein the shape thereof is substantially the same as the shape of the retaining grooves 74 formed on the lower surface of the slider 14. Flange sections 78 of the bearing 72 engage with the deep grooves 160 formed at both ends of the first bearing support member 86 (see FIG. 9). That is, the bearing 72 is interposed between the first bearing support member 86 and the guide section 38a. Therefore, the slider 14 can be displaced smoothly along the sliding surface between the slider 14 and the guide section 38a.

Figure 9:
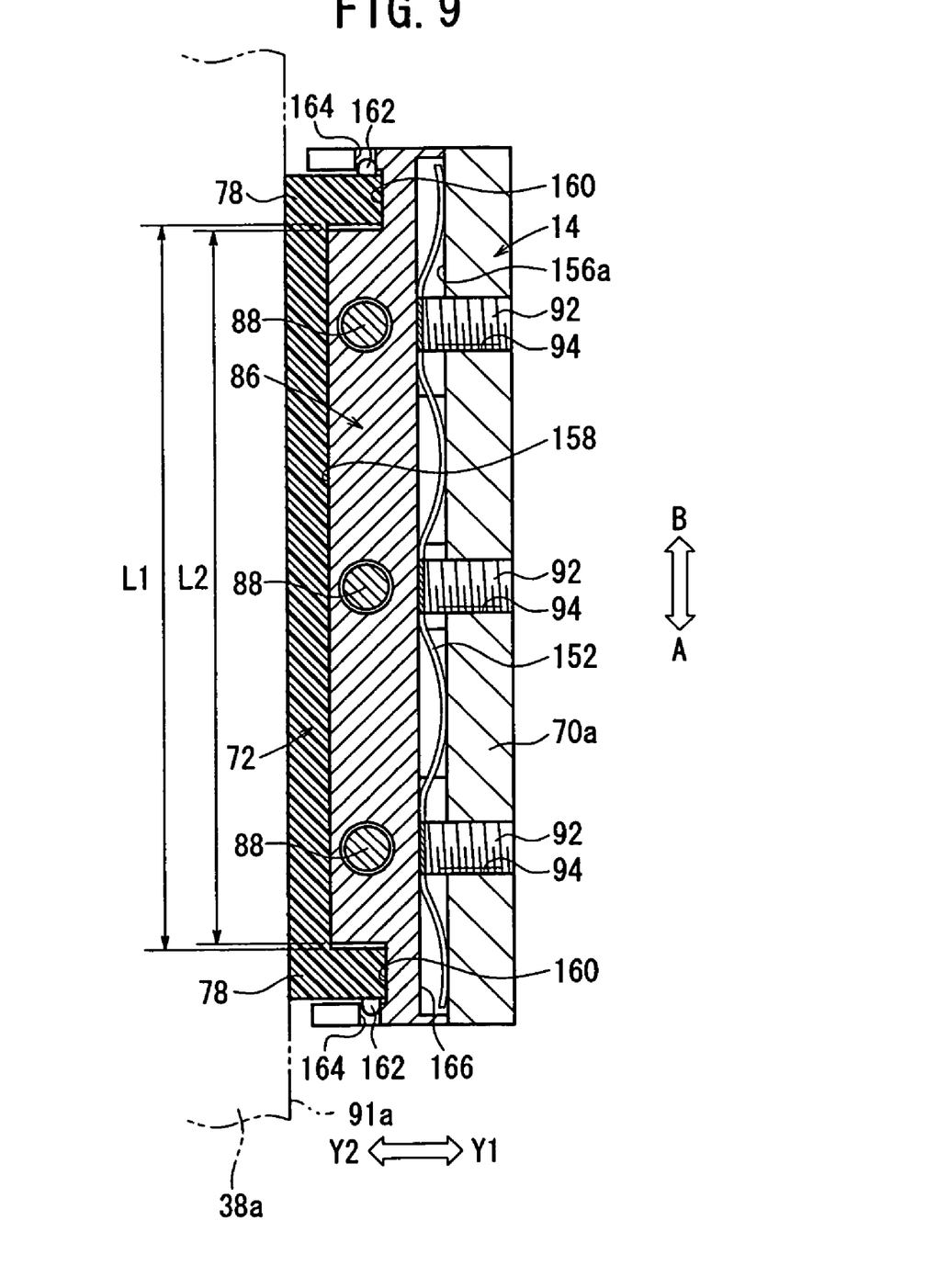
FIG. 9 is a longitudinal sectional view taken along line IX-IX shown in FIG. 7.

As shown in FIG. 9, the distance dimension L1, which is disposed between one flange section 78 and the other flange section 78 of the bearing 72, is larger than the distance dimension L2 between the deep grooves 160 (L1>L2). Therefore, the bearing 72 is slightly displaceable in the axial direction (direction of arrows A, B) within the retaining groove 158.

Projections 162, which protrude respectively toward the end blocks 16a, 16b, are formed at the end surfaces of the flange sections 78. When the flange sections 78 engage within the deep grooves 160, the projections 162 engage with recesses 164 formed at the end surfaces of the first bearing support member 86. Therefore, the bearing 72, which is installed in the retaining groove 158, can be prevented from disengaging from the retaining groove 158.

On the other hand, as shown in FIGS. 7 to 9, the first bearing support member 86 includes an installation hole 166, which faces the screw holes 94 into which the fixing bolts 88 are threaded, and which is recessed a predetermined depth on the side surface, in abutment against the retaining section 70a of the slider 14. The first elastic member 152 is installed in the installation hole 166.

The first elastic member 152 is composed of, for example, a spring such as a plate spring, which is bent at a plurality of positions in a wavy form, as shown in FIGS. 5 and 9. As shown in FIG. 9, the first elastic member 152 is disposed such that a plurality of (for example, three) portions, which are convex toward the first bearing support member 86, abut against the inner wall surface of the installation hole 166, and a plurality of (for example, four) portions, which are concave, abut against the inner wall surface of the installation groove 156a of the slider 14. In particular, the resilient force of the first elastic member 152 urges the first bearing support member 86 and the retaining section 70a of the slider 14 in directions to separate away from each other (see the direction of arrow Y1 shown in FIGS. 7 and 9).

Further, portions of the first elastic member 152 that abut against the inner wall surface of the installation hole 166 are supported by a plurality of (for example, three) plugs 92, which are threaded within the retaining section 70a of the slider 14. The plugs 92 are screw-engaged with the screw holes 94 so that the plugs 92 are substantially perpendicular to the through-hole 90 of the slider 14. Therefore, the first elastic member 152 is held in position while being pressed toward the first bearing support member 86 owing to the threaded engagement of the plugs 92.

Figure 10:
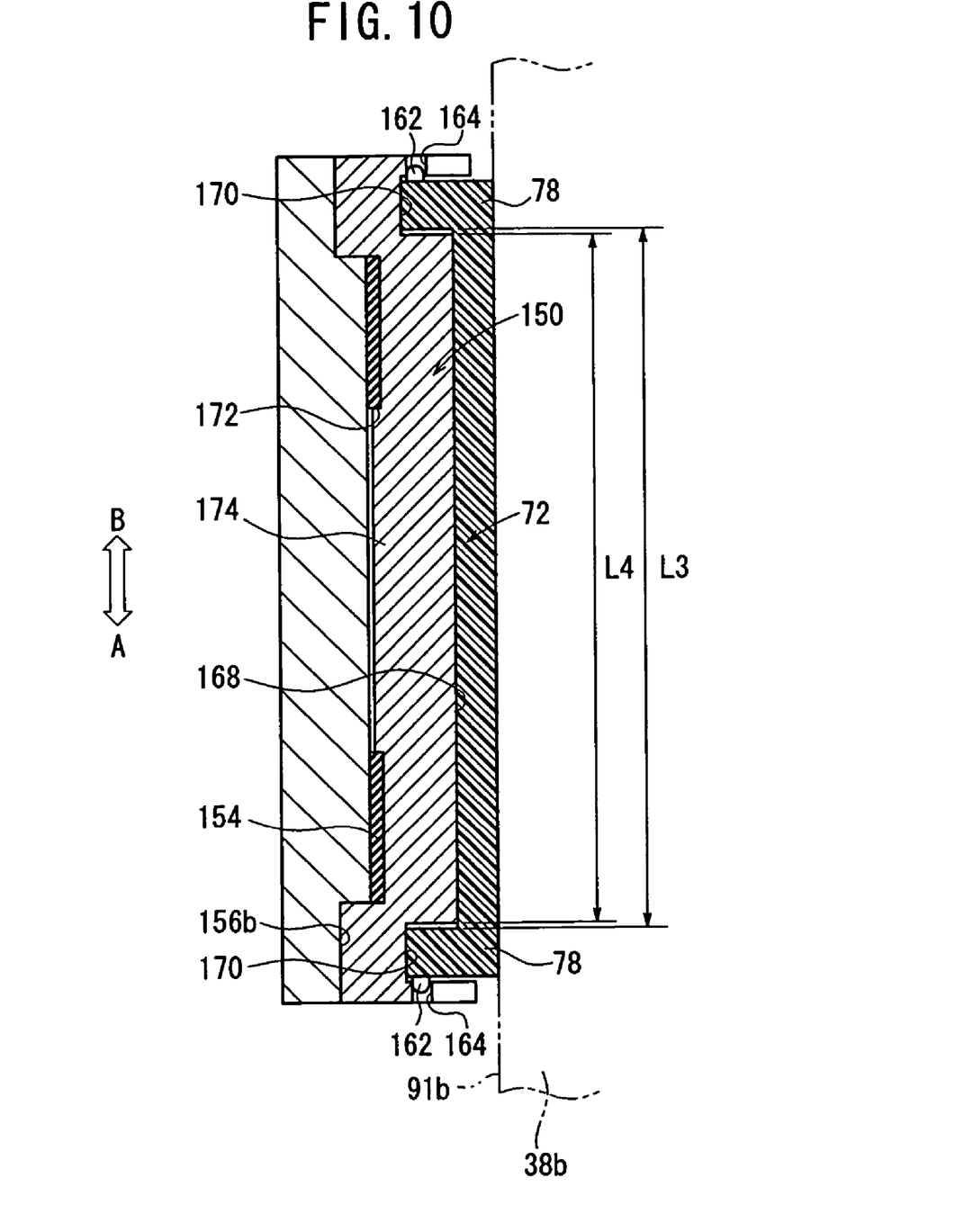
FIG. 10 is a longitudinal sectional view taken along line X-X shown in FIG. 7.

As shown in FIGS. 7, 8, and 10, the second bearing support member 150 is formed of, for example, a metal material such as aluminum. The second bearing support member 150 is installed in an installation groove 156b formed on the other retaining section 70b of the slider 14. A portion of the second bearing support member 150 that is installed in the installation groove 156b is substantially horizontal. Further, a portion thereof disposed on the side of the other guide section 38b abuts substantially perpendicularly against the side surface (sliding surface) 91b of the guide section 38b. That is, the second bearing support member 150 is interposed between the guide section 38b and the retaining section 70b of the slider 14.

A retaining groove 168, in which the bearing 72 is retained, is formed on the side surface of the second bearing support member 150 opposed to the guide section 38b. The retaining groove 168 extends in the axial direction of the slider 14 and has substantially the same shape as that of the retaining grooves 74 formed in the lower surface of the slider 14. The flange sections 78 of the bearing 72 engage respectively with the deep grooves 170 formed at both ends of the second bearing support member 150. Accordingly, as shown in FIGS. 7 and 8, the bearing 72 is interposed in a state of abutment, substantially perpendicularly with respect to the guide section 38b. Therefore, the slider 14 can be displaced smoothly along the sliding surface between the slider 14 and the guide section 38b.

As shown in FIG. 10, the distance L3 between one flange section 78 and the other flange section 78 of the bearing 72 is larger than the distance L4 between the deep grooves 170 (L3>L4). Therefore, the bearing 72 is slightly displaceable in the axial direction (direction of arrows A, B) inside the retaining groove 168.

Projections 162, which protrude toward the end blocks 16a, 16b respectively, are formed at end surfaces of the flange sections 78. When the flange sections 78 engage within the deep grooves 170, the projections 162 engage with recesses 164 formed at end surfaces of the second bearing support member 150. Therefore, the bearing 72, which is installed in the retaining groove 168, can be prevented from disengaging from the retaining groove 168.

As shown in FIGS. 5 and 10, a plate-shaped second elastic member 154 is interposed between the second bearing support member 150 and the inner wall surface of the installation groove 156b. The second elastic member 154 is formed, for example, from a hard rubber material having a substantially rectangular shape. A slit hole 172 having a predetermined length extending in the longitudinal direction is formed at a substantially central portion of the second elastic member 154. The slit hole 172 engages with a convex engaging projection 174, which is formed on the side surface of the second bearing support member 150. Accordingly, relative displacement of the second elastic member 154 is regulated with respect to the second bearing support member 150.

As described above, the second elastic member 154 is disposed between the second bearing support member 150 and the slider 14. Accordingly, the second bearing support member 150 is pressed toward the guide section 38b by means of the resilient force of the second elastic member 154.

The second bearing support member 150 may abut directly against the inner wall surface of the retaining section 70b, without intervention of the second elastic member 154. The second bearing support member 150 and the retaining section 70b may be formed in an integrated manner.

The first bearing support member 86 may be formed of an elastic material integrally with the first elastic member 152. Similarly, the second bearing support member 150 may be formed integrally with the second elastic member 154.

The bearing 72 may be formed integrally with at least one of the first and second bearing support members 86, 150. Accordingly, the number of parts can be reduced, facilitating assembly.

The guide mechanism 24 for the cylinder apparatus 10 according to the embodiment of the present invention is basically constructed as described above. Next, operations, functions, and effects thereof will be explained.

At first, explanations will be made concerning procedures for assembling the slider 14 onto the guide sections 38a, 38b of the cylinder tube 12, by means of the guide mechanism 24.

The piston yoke 50, which is connected to the pistons 40a, 40b, is initially inserted into the bore section 26 of the cylinder tube 12 and the coupler 58 is engaged with the piston yoke 50. Subsequently, the slider 14, with the bearings 72 installed in the retaining grooves 74, is assembled to the coupler 58 from an upper position above the cylinder tube 12. In this situation, the projections 162, which are formed at the flange sections 78 of the bearings 72, are inserted into the recesses 164 of the slider 14. Therefore, the bearings 72 do not become disengaged from the lower surface of the slider 14.

Subsequently, the bearing 72 is installed in the retaining groove 168 of the second bearing support member 150, and the second elastic member 154 is installed in the engaging projection 174. The second bearing support member 150 is inserted into the space between the slider 14 and the guide section 38b of the cylinder tube 12, in order to enable sliding movement in the axial direction. Accordingly, the second bearing support member 150 is installed in the installation groove 156b of the other retaining section 70b. In this situation, projections 162, which are formed at the flange sections 78 of the bearing 72, are inserted into the recesses 164 of the second bearing support member 150. Therefore, the bearing 72 does not become disengaged from the second bearing support member 150 during assembly thereof.

Finally, the bearing 72 is installed in the retaining groove 158 of the first bearing support member 86, and the first elastic member 152 is installed in the installation hole 166. The first bearing support member 86 is inserted into the space between one guide section 38a and one retaining section 70a of the slider 14, in order to enable sliding movement. Accordingly, the first bearing support member 86 is installed in the installation groove 156a of the retaining section 70a.

Accordingly, the first bearing support member 86, which is fastened by the slider 14, is pressed by the resilient force of the first elastic member 152 toward the side surface 91a of the guide section 38a. Therefore, the clearance between the guide sections 38a, 38b and the first and second bearing support members 86, 150, which occurs when the slider 14 is assembled onto the guide sections 38a, 38b of the cylinder tube 12, can be eliminated.

The first bearing support member 86 is fixed by fixing bolts 88 via the through-holes 90 with respect to the retaining section 70a, in a state in which the clearance is eliminated between the slider 14 and the guide sections 38a, 38b of the cylinder tube 12. Accordingly, the first bearing support member 86 is fixed with respect to the slider 14.

That is, when the first bearing support member 86 is fixed with respect to the slider 14, the plurality of bearings 72, which are provided for the slider 14, are pressed against the guide sections 38a, 38b under optimum pressing forces. Moreover, when the first bearing support member 86 is fixed to the slider 14 by the aid of the fixing bolts 88, the resilient force of the first elastic member 152 does not function with respect to the first bearing support member 86. Fixation is effected while the pressing force toward the guide section 38a is maintained.

The plugs 92, which are threaded into the retaining section 70a of the slider 14, are rotated until the plugs 92 abut against the first elastic member 152. Accordingly, the first bearing support member 86 is supported by the first elastic member 152 while the clearance between the guide section 38a and the first bearing support member 86 is eliminated. Accordingly, the first bearing support member 86 is positioned with respect to the slider 14. No displacements are caused in directions toward or away from the guide section 38a (directions of arrows Y1 and Y2, as shown in FIGS. 7 to 9).

When a clearance is generated between the slider 14 and the cylinder tube 12, for example, due to abrasion of the bearings 72 as a result of use over several years, the clearance can be appropriately eliminated, so that the second bearing support member 150 is pressed toward the cylinder tube 12 by means of the resilient force of the second elastic member 154 disposed between the second bearing support member 150 and the retaining section 70b of the slider 14. That is, the resilient force of the first elastic member 152 does not affect the cylinder tube 12 via the first bearing support member 86, because the first bearing support member 86 is fixed to the slider 14. Backlash, which occurs after the slider 14 has been assembled to the cylinder tube 12, is eliminated by the resilient force of the second elastic member 154.

Accordingly, backlash generated between the slider 14 and the cylinder tube 12, due to changes over time of the cylinder apparatus 10, can be eliminated by the second elastic member 154.

As described above, the slider 14 is installed on the guide sections 38a, 38b of the cylinder tube 12 through the aid of the guide mechanism 24. Accordingly, the bearing 72 can be pressed at a desired pressing force, so as to abut against the side surface 91a of the guide section 38a and serve as the sliding surface for the slider 14, by means of the resilient force of the first elastic member 152.

Therefore, it is possible to mitigate with respect to changes in the pressing force, which presses the bearing 72 against the guide section 38a, as compared with a conventional cylinder apparatus, in which the first and second sliding members of the guide mechanism are displaced toward the space between the cylinder tube and the slider by threaded rotation of screws in order to eliminate clearance between the cylinder tube and the slider. Therefore, a predetermined pressing force exerted on the guide section 38*a* can be easily maintained. Further, a wide setting range of pressing forces can be applied to the guide section 38*a*.

The pressing direction of the bearing 72 with respect to the guide section 38*a* is substantially perpendicular to the side surface 91*a*, which acts as the sliding surface for the guide section 38*a*. Accordingly, a larger setting range of pressing forces exerted by the bearing 72 can be secured.

Accordingly, when the slider 14 is assembled on the guide sections 38*a*, 38*b*, clearances generated by dimensional dispersion of the slider 14 and/or the cylinder tube 12 can appropriately be eliminated by the resilient force of the first elastic member 152. Backlash, which would be otherwise caused between the slider 14 and the cylinder tube 12, can be avoided.

As a result, when the slider 14 is assembled onto the guide sections 38*a*, 38*b* of the cylinder tube 12, the bearings 72 provided for the slider 14 abut against the guide sections 38*a*, 38*b* while being pressed at a desired pressing force. Therefore, the slider 14 can be displaced reliably and smoothly in the axial direction, under a guiding action effected by the guide sections 38*a*, 38*b* of the cylinder tube 12.

When the slider 14 is assembled onto the guide sections 38*a*, 38*b*, clearances generated between the slider 14 and the guide sections 38*a*, 38*b*, can be automatically eliminated, due to the resilient force of the first elastic member 152. Therefore, it is unnecessary to perform complicated adjustment operations, unlike the conventional cylinder apparatus, in which the first and second sliding members must be displaced by screws in order to eliminate the clearance. Thus, it is possible to shorten the period of time required for production of the cylinder apparatus 10.

The bearings 72, which are installed on the first and second bearing support members 86, 150, are always pressed at a predetermined pressure substantially perpendicularly to the side surfaces 91*a*, 91*b* of the guide sections 38*a*, 38*b* that act as sliding surfaces, owing to the resilient force of the first elastic member 152. Therefore, even when an external force is exerted, for example, by a workpiece or the like being placed on the upper surface of the slider 14, displacement of the slider 14, which would otherwise be caused by influence of the external force, can be suppressed, and the slider 14 can be guided reliably and appropriately along the guide sections 38*a*, 38*b* while being smoothly displaced in the axial direction.

The second elastic member 154 is provided between the second bearing support member 150 and the retaining section 70*b* of the slider 14. The second elastic member 154 is formed of, for example, a hard rubber material. Accordingly, the guide mechanism acquires a desired rigidity. Even if a clearance is generated again between the slider 14 and the cylinder tube 12, due to abrasion of the bearing 72 and causing backlash, it is possible to absorb and appropriately eliminate such backlash by means of the resilient force of the second elastic member 154.

Next, operation of the cylinder apparatus 10 having the guide mechanism 24 assembled as described above shall be explained. An explanation shall be given assuming that an initial position resides in a state in which the slider 14 and pistons 40*a*, 40*b* are displaced toward one end block 16*a* (in the direction of arrow B).

At first, in the initial position, a pressure fluid (for example, compressed air) is supplied to the first port 106 of the end block 16*a*. Accordingly, the pressure fluid is introduced into one cylinder chamber 110*a* of the cylinder tube 12 via the unillustrated passage of the end block 16*a*. The piston 40*a* is pressed toward the other end block 16*b* (in the direction of arrow A) under a pressing action effected by the pressure fluid. The slider 14 is displaced in the axial direction while being guided by the guide sections 38*a*, 38*b* integrally with the piston 40*a*, through operation of the piston yoke 50 and the coupler 58. In this situation, the second port 108 is open to atmospheric air.

During this operation, the upper belt 18 and the lower belt 20 disposed on the right side of the slider 14, which have been closed by means of the lower belt guide section 142 and the belt-holding section 128 of the guide member 124*b*, are opened by the belt separator section 126, in accordance with displacement of the slider 14. Conversely, the upper belt 18 and the lower belt 20 disposed in the vicinity of the central portion of the slider 14, which have been opened by the belt separator section 126 of the guide member 124*a*, are closed by the lower belt guide section 142 and the belt-holding section 128 of the belt guide mechanism 22, in accordance with displacement of the slider 14.

That is, the slider 14 is displaced in the axial direction (direction of arrow A) along the cylinder tube 12, in a state in which the slit 28 is sealed and the bore section 26 is closed, by means of the upper belt 18 and the lower belt 20.

The slider 14 is further displaced toward the other end block 16*b* (in the direction of arrow A), whereupon the shaft section 46 provided at the end of the piston 40*b* is inserted into the insertion hole 120 of the cylindrical member 118. Accordingly, fluid that flows between the shaft section 46 and the insertion hole 120 is blocked by the check packing 122 provided for the insertion hole 120 and the outer circumferential surface of the shaft section 46, so that the flow passage for the fluid is restricted to only an unillustrated bypass passage. Therefore, the displacement speed of the pistons 40*a*, 40*b* is gradually lowered. The end surface of the piston 40*b* abuts against the end surface of the cylindrical member 118, thereby arriving at its displacement terminal end position.

Subsequently, when an unillustrated directional control valve is switched to supply pressure fluid to the second port 108, the pressure fluid is introduced into the other cylinder chamber 110*b* of the cylinder tube 12, via the unillustrated passage of the end block 16*b*. The piston 40*b* is pressed toward one end block 16*a* (in the direction of arrow B) under a pressing action effected by the pressure fluid. The slider 14 is displaced in the axial direction (direction of arrow B) along the guide sections 38*a*, 38*b* of the cylinder tube 12 together with the piston 40*b*.

In this situation, the upper belt 18 and the lower belt 20, which have been closed by the lower belt guide section 142 and the belt-holding section 128 of the guide member 124*a*, are opened by the belt separator section 126 of the guide member 124*a*, reversely to the situation in which the slider 14 is displaced toward the other end block 16*b*. The upper belt 18 and the lower belt 20, which have been opened by the belt separator section 126 of the guide member 124*b*, are closed by the belt-holding section 128 and the lower belt guide section 142.

The slider 14 is further displaced toward one end block 16*a* (in the direction of arrow B), whereupon the shaft section 46 provided on the piston 40*a* is inserted into the insertion hole 120 of the cylindrical member 118. Accordingly, the displacement speed of the pistons 40*a*, 40*b* is lowered, and then the end surface of the piston 40*a* abuts against the end surface of the cylindrical member 118. Accordingly, displacement is stopped and the slider 14 is restored to its initial position.

Although certain preferred embodiments of the present invention have been shown and described in detail, it should be understood that various changes and modifications may be made therein without departing from the scope of the appended claims.

What is claimed is:

1. A guide mechanism for a cylinder apparatus for displacing a displacement member disposed outside of a main cylinder body in an axial direction, said guide mechanism being disposed between said main cylinder body and said displacement member, for retaining said displacement member displaceably with respect to said main cylinder body, said guide mechanism comprising:
   a pair of retaining members disposed respectively between said displacement member and a pair of guide sections formed on said main cylinder body for retaining said displacement member;
   bearings for making sliding contact with said guide sections; and
   elastic sections arranged respectively between said pair of retaining members and said displacement member for urging said pair of retaining members toward said guide sections, wherein said elastic sections comprise:
   a first elastic member on one of said pair of retaining members, which urges the one retaining member toward one guide section; and
   a second elastic member on another of said pair of retaining members, which urges the other retaining member toward another guide section.

2. The guide mechanism according to claim 1, wherein said first elastic member and said second elastic member press said bearings via said pair of retaining members, in a direction substantially perpendicular to sliding surfaces of said guide sections.

3. The guide mechanism according to claim 2, wherein one of said pair of retaining members is fixed by a fixing member with respect to said displacement member to regulate displacement of said displacement member, which is caused by a resilient force of said first elastic section directed toward said one guide section.

4. The guide mechanism according to claim 1, wherein one of said pair of retaining members is fixed by a fixing member with respect to said displacement member.

5. The guide mechanism according to claim 4, wherein said fixing member that fixes said one retaining member is disposed substantially in parallel to a sliding surface composed of said one guide section and said bearing.

6. The guide mechanism according to claim 1, wherein said first elastic member comprises a wavy form having a plurality of bent portions, and wherein one side surface of said first elastic member protrudes toward and abuts against said one retaining member, and another side surface of said first elastic member protrudes toward and abuts against said displacement member.

7. The guide mechanism according to claim 6, wherein said first elastic member is pressed toward said one retaining member by a plug threaded with said displacement member, and said first elastic member is interposed between said plug and said one retaining member.

8. The guide mechanism according to claim 7, wherein said plug is provided movably back and forth in directions substantially perpendicular to said sliding surface of said one guide section.

9. The guide mechanism according to claim 1, wherein said second elastic member is plate-shaped having a slit therein, wherein said slit engages with a projection of said other retaining member.

10. The guide mechanism according to claim 1, wherein said one retaining member is formed integrally with said bearing or with said first elastic member, and said other retaining member is formed integrally with said bearing or with said second elastic member.

11. The guide mechanism according to claim 1, wherein said cylinder apparatus comprises a rodless cylinder.

* * * * *